Patented Aug. 17, 1954

2,686,752

UNITED STATES PATENT OFFICE 2,686,752

ENZYMATIC HYDROLYSIS OF STEROIDAL SAPONINS

Monroe E. Wall, Oreland, and Merle M. Krider, Philadelphia, Pa., assignors to the United States of America as represented by the Secretary of Agriculture No Drawing. Application October 10, 1952, Serial No. 314,231

14 Claims. (Cl. 195—32)

(Granted under Title 35, U. S. Code (1952), sec. 266)

A non-exclusive, irrevocable, royalty-free license in the invention herein described, for all governmental purposes, throughout the world, with power to grant sublicenses for such purposes, is hereby granted to the Government of the United States of America.

Steroidal sapogenins are useful as starting material for the synthesis of sex hormones and cortisone. They occur in certain plants in a combined glycosidal form called steroidal saponins, this latter term meaning the naturally-occurring glycosides that on hydrolysis yield steroidal sapogenins.

In conventional processes used heretofore, steroidal sapogenins are obtained from the steroidal saponins in which they occur by means of a strong acid hydrolysis, as for instance, by boiling with 2 N hydrochloric acid. This is difficult and expensive on a large scale because of corrosion problems and also because the tars and resins produced complicate the extraction and purification of the desired products.

We have discovered that plants, such as those of the species *Agave toumeyana*, Dioscorea, *Yucca carnerosana*, *Yucca gloriosa*, *Agave serulata*, and *Agave fourcroyoides*, which contain steroidal saponins also contain an enzyme or enzymes, which, under proper conditions, is capable of hydrolyzing the steroidal saponin thus liberating the steroidal sapogenin.

We have further discovered that the enzyme from one type of steroidal saponin-bearing plant will catalyze the hydrolysis of the steroidal saponins from other types of plants.

In general according to the invention, a substantially aqueous solution of the steroidal saponin is treated with an aqueous extract of steroidal saponin-containing plant material, the extract containing an enzyme or enzymes, corresponding to one derived from a steroidal saponin-bearing plant, capable of hydrolyzing the steroidal saponin.

In the practice of our invention, the steroidal saponin-bearing plant material, such as the leaves, is ground or shredded and the enzyme is extracted with cold water, preferably at a temperature from about 0°–5° C. The steroidal saponin is then extracted with a suitable solvent, such as hot water or alcohol and the steroidal saponin, in substantially aqueous solution, is mixed with the enzyme solution. The mixture is then kept at a temperature between room temperature and that at which deactivation of the enzyme takes place until hydrolysis of the steroidal saponin is substantially complete. This might suitably be from 1 to 4 days at about 37° C. The steroidal sapogenin is then recovered from the medium and purified by any convenient procedure. Suitable methods are described in our copending applications "Purification and Separation of Sapogenins by Adsorption," filed July 29, 1952, Serial Number 301,614, and "Isolation of Sapogenins," filed December 2, 1952, Serial Number 323,735. Since the steroidal sapogenin is only slightly soluble in the aqueous medium, most of it precipitates from the enzyme solution as fast as it is liberated from the steroidal saponin and may be recovered by filtering, centrifuging, extracting with a water-immiscible steroidal sapogenin solvent such as benzene, or by other known processes.

The invention is illustrated by the following typical example:

Two kilograms of fresh *Agave toumeyana* leaves were ground and passed through a 1″ mesh screen. Two liters of water at about 0°–5° C. were added and the suspension was stirred for 10 minutes. The water was then pressed out and the process repeated with fresh water. The combined extract containing most of the enzyme was clarified by centrifuging (or filtering) and stored in the refrigerator at about 4° C.

The remaining leaf solids plus the sludge removed from the enzyme solution was extracted with 2 l. of 95% ethanol and then with 2 l. of 85% ethanol. The combined alcoholic filtrates were concentrated by distillation to remove most of the alcohol, extracted with 1.5 l. of benzene to remove fatty materials, pigments, etc. and then freed of alcohol by adding 0.5 l. of water and concentrating by distillation. The residual substantially aqueous solution contained the steroidal saponins not removed from the plant material by the previous aqueous extraction.

The cooled steroidal saponin extract was combined with the enzyme extract and stored 90 hr. at 37° C. During this time the clear solution changed to a turbid suspension because the steroidal sapogenin liberated by the enzyme action was insoluble in the aqueous medium. The suspension was extracted with 4–5 l. of a 10% solution of ethanol in benzene, which dissolved the steroidal sapogenins (alternatively, most of the steroidal sapogenins could be recovered by centrifuging the suspension). From the benzene extract there was recovered 3.5 g. of hecogenin and 4.5 g. of manogenin.

In a similar manner we have obtained diosgenin from species of Dioscorea, kammogenin from *Yucca carnerosana*, a typical mixture of steroidal sapogenins from *Yucca gloriosa*, sarsasapogenin from other Yucca species, and hecogenin and manogenin from *Agave serulata* and *Agave fourcroyoides*.

Other variants of this procedure are obvious. After extracting the enzyme with cold water, the residual steroidal saponins can be extracted with hot water or any suitable steroidal saponins solvent. Time and temperature for enzyme action can be varied, but those given in our procedure give good results.

It is also apparent that the enzyme can be extracted from one source material and applied to steroidal saponin from another. For example, the steroidal saponin-free enzyme extract of *Agave toumeyana* was combined with a dioscin preparation from a Dioscorea. Following the time lapse for enzyme action, diosgenin was obtained from the mixture.

Using purified enzyme and steroidal saponin preparations are other variations of our procedure.

In still another variation, both the enzyme and the steroidal saponin can be simultaneously extracted from the plant material by using a suitable solvent such as warm water or dilute aqueous alcohol at a temperature insufficient to inactivate the enzyme. The hydrolysis can then be achieved by simply storing this solution under suitable conditions.

We claim:

1. The process of recovering steroidal sapogenins from steroidal saponins derived from a plant material of a plant selected from the group consisting of an Agave, a Yucca, and a Dioscorea, comprising treating a substantially aqueous solution of the said steroidal saponins with an aqueous extract of steroidal saponin-containing plant material of a plant selected from the same group, said extract containing an enzyme capable of hydrolyzing the steroidal saponins.

2. The process of claim 1 wherein the steroidal saponins and the enzyme are derived from the same plant species.

3. The process of claim 1 wherein the plant is an Agave.

4. The process of claim 1 wherein the plant is a Yucca.

5. The process of claim 1 wherein the plant is a Dioscorea.

6. The process of recovering steroidal sapogenins from plant material containing steroidal saponins and derived from a plant selected from the group consisting of an Agave, a Yucca, and a Dioscorea, comprising first extracting the plant material with water to obtain a solution containing an enzyme capable of hydrolyzing steroidal saponins, then extracting the plant material with a steroidal saponin solvent to obtain a steroidal saponin solution, then combining the enzyme solution with the steroidal saponins in aqueous solution and storing the mixture at a temperature favorable for enzymatic action and for a time sufficient for substantially complete hydrolysis of the steroidal saponins, and then recovering the steroidal sapogenins thus liberated.

7. The process of claim 6 wherein the steroidal saponin solvent is hot aqueous alcohol.

8. The process of claim 6 wherein the plant material is derived from an Agave.

9. The process of claim 6 wherein the plant material is derived from a Yucca.

10. The process of claim 6 wherein the plant material is derived from a Dioscorea.

11. The process of recovering steroidal sapogenins from plant material containing steroidal saponins and derived from a plant selected from the group consisting of an Agave, a Yucca, and a Dioscorea, comprising extracting the plant material with a solvent which dissolves the hydrolytic enzyme present without deactivating it and which also dissolves the steroidal saponins present, storing the enzyme steroidal saponin solution under conditions favorable to enzyme activity until the steroidal saponin is substantially completely hydrolyzed to steroidal sapogenine, and then recovering the steroidal sapogenins from the mixture.

12. The process of claim 11 wherein the plant material is derived from an Agave.

13. The process of claim 11 wherein the plant material is derived from a Yucca.

14. The process of claim 11 wherein the plant material is derived from a Dioscorea.

References Cited in the file of this patent

UNITED STATES PATENTS

| Number | Name | Date |
|---|---|---|
| 2,069,687 | Stoll et al. | Feb. 2, 1937 |

OTHER REFERENCES

Jacobs et al., J. Biol. Chem., vol. 69, pages 153–163; 1926.